United States Patent Office 2,940,770
Patented June 14, 1960

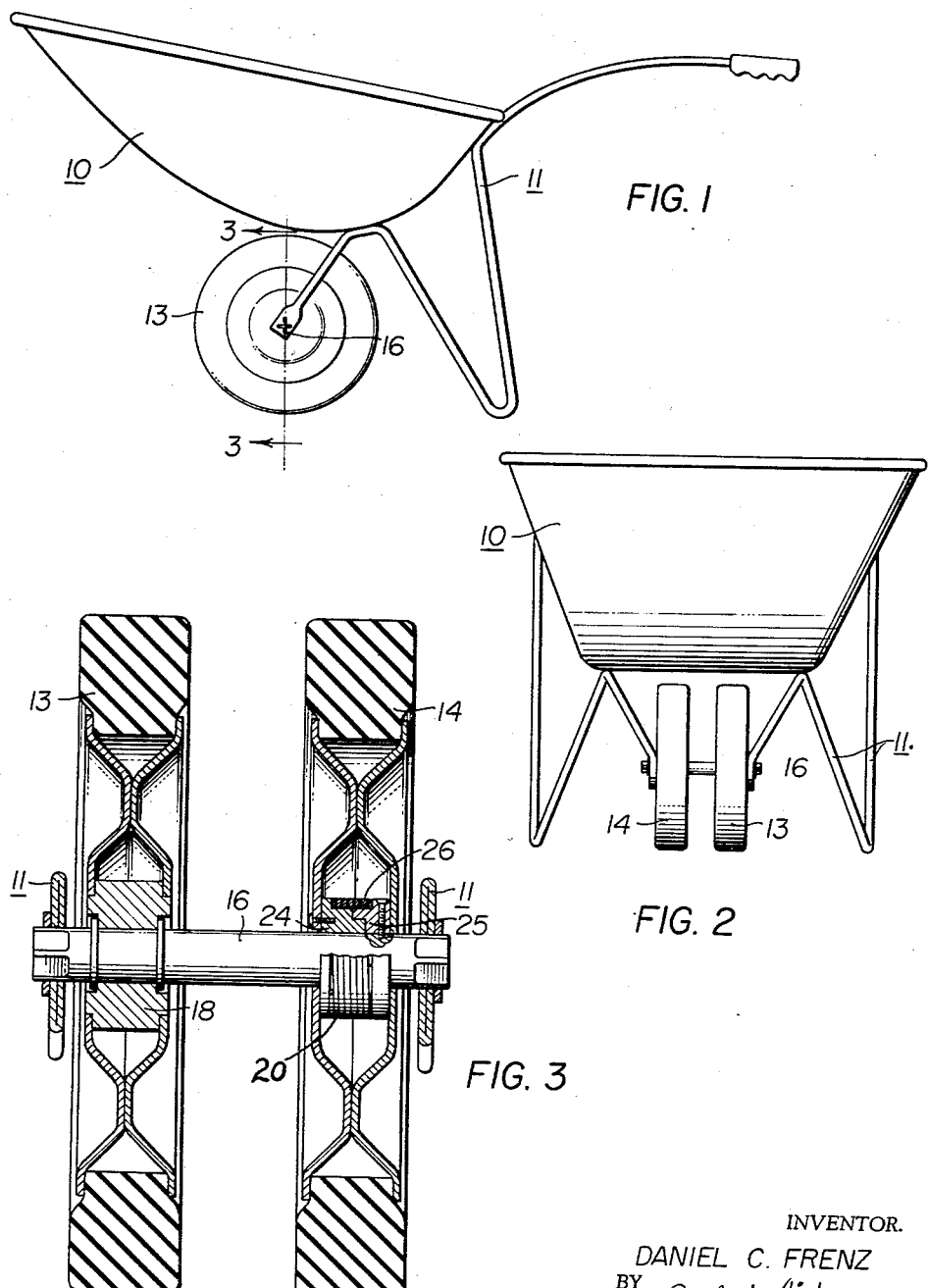
June 14, 1960     D. C. FRENZ     2,940,770
WHEELBARROW
Filed May 21, 1958
INVENTOR.
DANIEL C. FRENZ
BY Pyle & Fisher
ATTORNEYS

2,940,770

WHEELBARROW

Daniel C. Frenz, 241 Harmon Road, Aurora, Ohio

Filed May 21, 1958, Ser. No. 736,828

4 Claims. (Cl. 280—47.26)

This invention relates in general to load-bearing, manually-operated vehicles, and relates more particularly to a device known as a wheelbarrow; to an improved wheelbarrow load balance design, and to a wheel lock system that produces improved wheelbarrow handling characteristics that make the balance design operable.

The wheelbarrow is ancient in its basic concept and has not changed in any material aspect from its ancient origin.

The principal object of this invention is to provide a wheel system for a load-bearing device, which wheel system will prevent reverse travel of the device unless so willed by the operator.

As applied specifically to a wheelbarrow, it is the object of this invention to provide a wheel system which will provide two support wheels, at least one of which will rotate in only a forward direction to prevent shifting force components from "kicking" the wheel system rearwardly during load dumping.

It is therefore, a further object of this invention, to provide a wheelbarrow with a dual wheel system, one of which is free rotating and the other of which will not rotate in reverse, in order that the wheelbarrow will not reverse unintentionally but may be reversed at will by tipping the load to the free rotating wheel.

It is still a further object of this invention, made possible by the improved wheel system, to provide an improved load-bearing location for the wheel system of a wheelbarrow.

A further object of the invention is to provide lateral stability of the two wheels not found in one-wheeled load-carrying devices.

Other objects and a fuller understanding of the invention may be had by referring to the following description and claims, taken in conjunction with the accompanying drawing, in which:

Figure 1 is a side view of a preferred design wheelbarrow embodying the features of this invention;

Figure 2 is a front view of this barrow; and,

Figure 3 is a section view taken along line 3—3 of Figure 1.

From the selected objects enumerated to give direction to this explanation of the invention, and from a hasty examination of the drawing, the general extent of this invention will be readily apparent.

A load-receptacle body 10, a frame assembly 11— which includes handle and foot section—and a wheel assembly embodying wheels 13 and 14, are the principal components of the illustrated embodiment.

Note, first, that there are two wheels rather than the conventional one wheel. This invention contemplates the use of a wheel which is adapted to rotate in only one direction; forward. However, it is necessary, often, to reverse the barrow. To do so, the second wheel is free running. Hence, to reverse, the operator tips the body 10 over on to the single wheel 13 and then the barrow can reverse.

When a load is carried by any barrow, the load forces urge the handles and the wheel in the direction of the support surface. During dumping operations, however, the load center is shifted forward and as the handles are elevated, a position is accomplished where the load center of gravity is forward of the wheel. When this happens, a rearward component of force is created by the cam action of the body and the moving load. The result is a full loop by the barrow unless the wheel is restrained against reversal, and the handle held firmly.

The common means to prevent wheel reversal is the operator's foot. A heavily booted toe under the wheel usually will prevent reversal. However, a poorly located wheel block, or an inadvertent partial tipping due to striking an obstacle, may overbalance the load and flip the barrow over. Inconvenience is the least result, and injury often occurs when such unintentional dumping takes place. Further, heavy loads are difficult to hold normally.

It has been recognized heretofor, that wheel brakes on load-bearing parts are useful to control the cart. At least one inventor has shown the use of wheel locks to hold a trailer steady while the body thereof is tipped to serve as a loading ramp. A wheelbarrow wheel brake is a common device on heavy-duty wheelbarrows.

These suggestions have not provided the very useful results attempted to be taught. This invention permits the barrow to be handled in the normal manner without thought about operation of brakes. It cannot back up unless the operator takes steps to overcome the normal anti-reversal characteristics.

Many methods may be employed to provide the non-reversal feature, and such devices as detent and friction devices have been examined. However, as a most satisfactory commercial selection, as herein illustrated, it is believed that the relatively new spring clutches, now commercially available, are best suited.

In Figure 3, it will be seen that axle 16 is formed into a non-circular configuration at each end, and is non-rotatively interlocked to frame 11. Such construction is conventional and self-evident, so it need not be explained further.

Wheel 13 is journeled on the shaft 16 by a bearing 18, and is free to rotate in either forward or reverse direction. The wheel 14, by contrast, is free to rotate only in one direction.

A spring clutch 20 is employed as a mounting bearing for a wheel 14. The clutch 20 is an improved device of recent development and has many uses. It is not a part of this invention per se, except that it is the preferred choice of a one-way clutch in this invention which requires such a one-way clutch.

The clutch 20 is a positive-action clutch which will transmit torque by means of static friction which is created when the spring expands or contracts. The basic elements of the clutch 20 are the two drums 24 and 25 of approximately equal size, and a helical wound spring 26. The spring 26 bridges the two drums. Torque is transmitted by the gripping action of the spring. This gripping action is instantaneous and positive. There is no slipping or soft pickup. Drum 24 is attached to the wheel and drum 25 is attached to the axle.

This clutch 20 is employed in a reverse manner in that it is normally not engaged, but over-running. As long as the barrow is moved forward there is no interference and no drag. But an attempt to reverse the barrow on the wheel 14 will be instantaneously resisted.

The safety feature and convenience will be readily appreciated. Heavy loads may be quite easily dumped at a precise location without question. Hand brake devices depend upon operator activation and will not allow the operator to give full attention to the work being done, and therefore are not recommended. Hand brakes also require extra moving parts and levers entailing added expense in manufacturing and in upkeep since hand brakes cause wear on tire or axle.

Correlated features of the invention, which depend upon the improved non-reverse wheel, are the lateral stability and improved balance of most of the load on the wheel system.

Dump carts were developed to carry loads slung between larger wheels, and hence not subject to tipping. One wheelbarrow is known which is convertible to a cart. Because the cart needs two wheels, the barrow has two wheels, however, the two wheels are located far forward in the conventional wheel location. Thus, the load is slung between handles and wheels, the load is heavy upon the operator as in all standard one-wheel barrows.

According to the improved design of this invention, the wheel system is located well under the center of gravity of the body 10. Hence, the wheels take the bulk of the load. In fact, the load can be almost fully balanced upon the wheels.

Were it not for the fully self-activated, non-reversal wheel 14, such wheel location would be entirely impractical. Further, the use of two wheels provide the lateral stability which might otherwise be difficult to maintain at such a location. Whereas two wheels in the usual forward location will be of little attraction as an advance barrow feature, in this invention the dual wheel is quite functional.

Although the invention has been described in its preferred embodiment with a certain amount of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A wheelbarrow comprising, a body member, a support carriage mounting the body, said support carriage including first and second brackets spaced on opposite sides of the longitudinal centerline of the body member, first and second road support wheels journaled on the carriage between said brackets, said wheels spaced from one another a distance less than the diameter of the wheels and from the lateral sides of the body a distance at least as great as the radius of the wheels, and unidirectional clutch means interconnected between said first wheel and the carriage to prevent reverse rotation of said first wheel when the body is pivoted around said first wheel axis, said second wheel being permanently free-wheeling in both directions.

2. A wheelbarrow comprising, a body member, a support carriage mounting the body, said support carriage including first and second brackets spaced on opposite sides of the longitudinal certerline of the body member, first and second road support wheels journaled on the carriage between said brackets, said wheels spaced from one another a distance less than the diameter of the wheels and from the lateral sides of the body a distance at least as great as the radius of the wheels, said wheels rotatable about a common axis, and unidirectional clutch means interconnected between said first wheel and the carriage to prevent reverse rotation of said first wheel when the body is pivoted around said first wheel axis, said second wheel being permanently free-wheeling in both directions.

3. A wheelbarrow comprising, a body member, said body member having a dished cargo-holding form, said dished form defining a center of gravity for a load carried thereby, first and second road support wheels, means mounting said body on said wheels with the wheels spaced from one another a distance less than the diameter of the wheels and from the lateral sides of the body a distance at least as great as the radius of the wheels, said wheeled body having a normal forward direction of movement and a reverse direction of movement, and unidirectional clutch means preventing reverse rotation of said first wheel, said second wheel being permanently free-wheeling in both directions.

4. A wheelbarrow comprising, a body member, said body member having a dished cargo-holding form, said dished form defining a center of gravity for a load carried thereby, first and second road support wheels, means mounting said body on said wheels with the wheels spaced from one another a distance less than the diameter of the wheels and from the lateral sides of the body a distance at least as great as the radius of the wheels, said wheeled body having a normal forward direction of movement and a reverse direction of movement, said wheels being in side by side relationship and the said center of gravity being above and between said wheels, and unidirectional clutch means preventing reverse rotation of said first wheel, said second wheel being permanently free-wheeling in both directions.

References Cited in the file of this patent

UNITED STATES PATENTS

| 271,152 | Strugnell | Jan. 23, 1883 |
| 385,381 | Spalding | July 3, 1888 |
| 1,153,557 | Lindstrom | Sept. 14, 1915 |
| 2,220,599 | Galter | Nov. 5, 1940 |
| 2,824,748 | Schoenberger | Feb. 25, 1958 |
| 2,829,748 | Sacchini | Apr. 8, 1958 |
| 2,844,225 | Hubbard | July 22, 1958 |

FOREIGN PATENTS

| 593,830 | Great Britain | Oct. 27, 1947 |
| 664,450 | Great Britain | Jan. 9, 1952 |